United States Patent [19]

Baumann

[11] Patent Number: 4,549,719
[45] Date of Patent: Oct. 29, 1985

[54] MECHANICAL AMPLIFYING MEANS FOR VALVES AND OTHER DEVICES

[76] Inventor: Hans D. Baumann, 32 Pine St., Rye, N.H. 03870

[21] Appl. No.: 576,362

[22] Filed: Feb. 2, 1984

[51] Int. Cl.⁴ ............................................. F16K 31/44
[52] U.S. Cl. .................................. 251/280; 251/244; 251/263; 74/110; 100/291; 269/32
[58] Field of Search ................ 74/110, 516; 251/61.1, 251/61.4, 280, 63.4, 63.6, 242, 244, 251, 263, 293, 347; 100/291; 269/32

[56] References Cited

U.S. PATENT DOCUMENTS

| | | | |
|---|---|---|---|
| 905,172 | 12/1908 | Godson | 251/293 X |
| 1,842,869 | 1/1932 | Hale | 251/347 X |
| 2,395,223 | 2/1946 | Ingres | 74/516 X |
| 2,443,775 | 6/1948 | Olson | 269/32 |
| 3,941,362 | 3/1976 | Arnold et al. | 269/32 |
| 4,265,141 | 5/1981 | Bowman | 251/280 X |
| 4,270,398 | 6/1981 | Arnold | 74/110 |
| 4,278,234 | 7/1981 | Baumann | 251/57 |
| 4,320,778 | 3/1982 | Baumann | 251/57 X |

Primary Examiner—Larry Jones
Assistant Examiner—Noah Kamen

[57] ABSTRACT

Mechanical amplifying means for valves and other devices which may be used to replace heretofore employed hydraulic jacks capable of transforming a small force traveling a great distance into a large force being motivated over a small distance, and where such amplifying ratios exceed 30 to 1; the mechanical amplifying means consisting of two upper ball bearings wedged tangentially apart by a profiled pushrod which in turn causes a co-sinusoidal, small-distance displacement of a lower pair of ball bearings.

5 Claims, 4 Drawing Figures

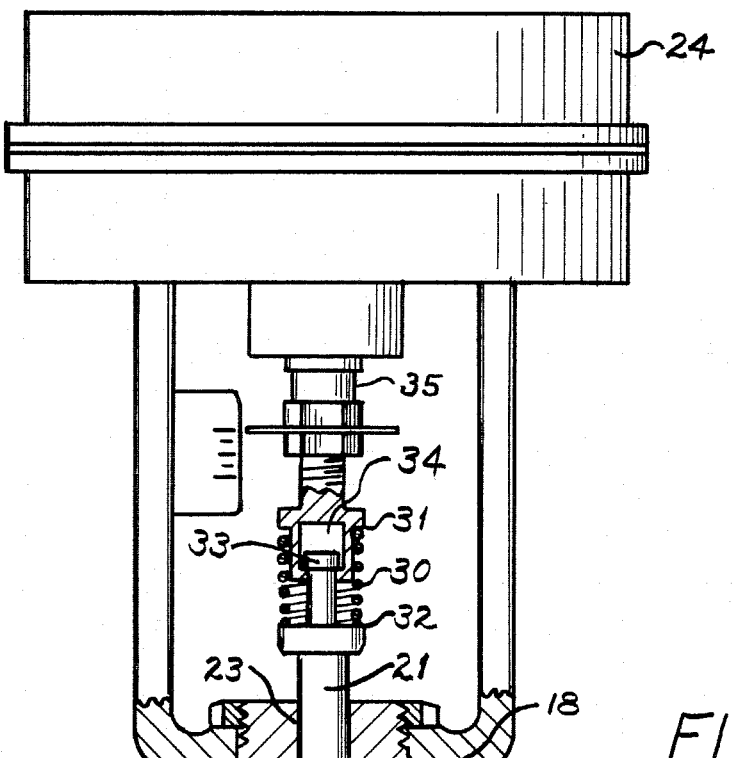
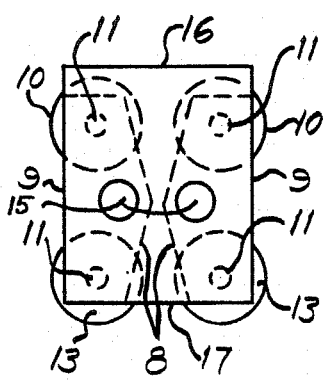
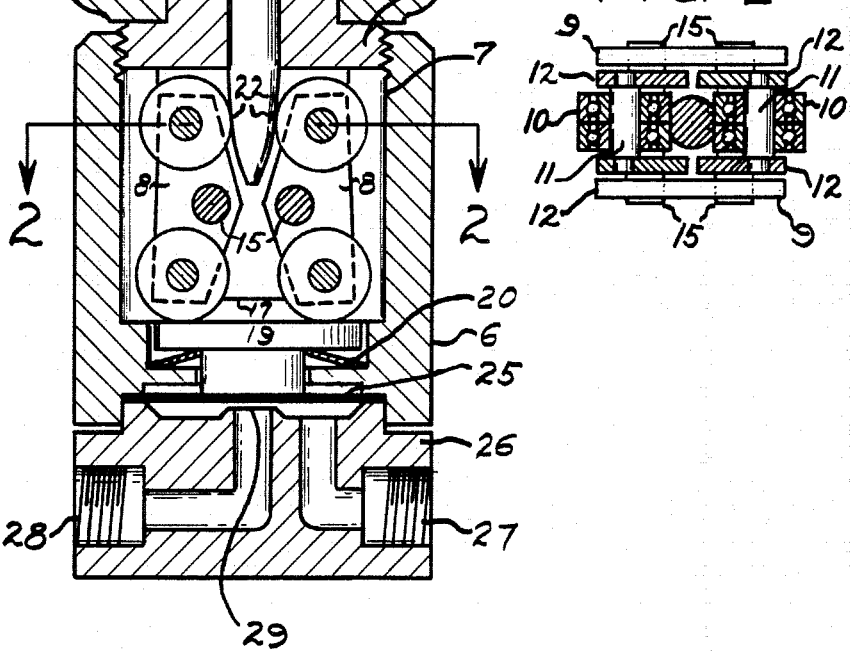
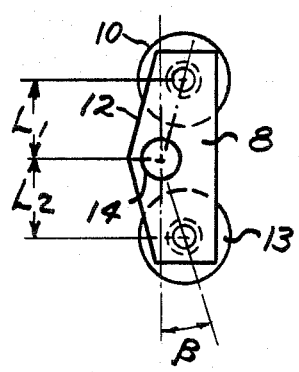
FIG. 1
FIG. 2
FIG. 3
FIG. 4

MECHANICAL AMPLIFYING MEANS FOR VALVES AND OTHER DEVICES

BACKGROUND OF THE INVENTION

This invention relates to mechanical amplifying means which may be used in place of previously employed hydraulic jacks and other hydraulic devices which are well-known to the experts in the field and which are capable of converting small input forces travelling a great distance into very large output forces motioned a respectively shorter distance. Hydraulic devices are capable of performing this task extremely well and with very high efficiencies; that is, very little of the translated work is lost by way of friction. Hydraulic devices fitting the above description are commonly used on tool machinery to position tools, to lift heavy loads such as machinery, for construction equipment and which are also used to close valve plugs against very high pressure differentials of liquid or gaseous media (see my U.S. Pat. No. 4,320,778).

However one of the disadvantages of such hydraulic means to alter the force/distance relationship is that hydraulic devices are very susceptible to leakage and rams or piston rods have to be very precisely machined to avoid leakage between sliding stem seals especially when one considers the very high (usually on the order of 1,000–3,000 psi) hydraulic fluid pressures involved. Another disadvantage of hydraulic means is the very high coefficient of cubic thermal expansion which is especially troublesome when a valve to be closed handles a hot fluid, or when the precision-positioned machine tool becomes warm while performing work. Such undesireable thermal-expansion can lead to rather large positioning errors.

My invention overcomes these disadvantages by:

a. eliminating the requirement for a hydraulic fluid, not requiring fine surface finishes, sliding stem seals and the potential of a hydraulic leak; and b. by utilizing all-metal parts in its construction, it is capable of operating over wide temperature ranges without experiencing significant positioning errors due to thermal-expansion problems.

In addition, my mechanical apparatus is very easy to handle, has a very high efficiency (similar to that of hydraulic systems) and can be produced very economically and without great need for precision.

As a result of the above-cited advantages, such mechanical amplifying means are now capable of replacing hydraulic amplifying and positioning means on valves such as the one shown in my U.S. Pat. No. 4,278,234, for example.

More advantages of my invention will become apparent when viewed in light of the following description.

DESCRIPTION OF DRAWINGS

FIG. 1 is a vertical, central, cross-sectional view showing a preferred structure and arrangement of parts of my invention employed in conjunction with valving means.

FIG. 2 is a horizontal cross-sectional view of the amplifying portion of my invention taken along the lines 2—2 in FIG. 1.

FIG. 3 is an external vertical view of part of the amplifying means when removed from the housing structure of FIG. 1.

FIG. 4 is a detailed view of one of the pair of toggle elements from FIG. 3 for further clarification.

DESCRIPTION OF THE INVENTION

The subject invention comprises a housing (6) having a central opening (7) to receive a pair of toggle means (8) mounted between a pair of plates (9). Each toggle means (8) is comprised of one or more upper ball bearings (10) mounted on a shaft (11) between a pair of inner plates (12) plus one or more lower ball bearings (13) equally as well-supported by shafts (11) between said inner plates (12). In a preferred configuration, both upper and lower bearings are spaced equal distance $L_1 = L_2$ from a central bore (14) capable of receiving additional shaft means (15) which are suitably retained within the pair of outer plates (9) in such a manner to allow a free-tilting motion of said toggle means (8) around the axis of bore (14). It should be noted that as shown in FIG. 3, the pair of outer plates (9) has an upper terminating flat surface (16) which extends above the outer extremity of the upper bearings (10). The lower terminating surface (17) of plates (9) are shortened to allow for the extension of lower bearings (13) beyond surface (17).

The complete toggle mechansim as shown in FIG. 3 is inserted into housing bore (7) as shown in FIG. 1. A retaining means (18) threadingly engages bore (7) to engage surfaces (16) of the outer plates (9) thereby bringing the lower bearings (13) in firm contact with a displacement piston (19) which is resiliently supported by a spring (20). By screwing retaining means (18) more or less out of housing bore (7), surface (16) and thereby the complete toggle mechanism of FIG. 3 can be adjusted in its engaging relationship with displacement piston (19) to overcome manufacturing problems relating to the machining tolerances of either the depth of bore 7, the distances $L_1$ or $L_2$ or the distance between shaft means (15) and upper surface (16) for example. A slideable stem (21) having a lower wedge-shaped or curved profile (22), is engaged within a central bore (23) of retaining means (18). Said slideable stem is capable of being pushed down by suitable means such as a pneumatic cylinder (24), for example. When this occurs, the wider portions of wedge (22) causes a outward motion of the upper ball bearings (10) causing a tangential displacement and a tilting motion of the toggle element (8) over the axis of bore (14). This, in turn, causes a reduction in angle $\beta$ which then extends the distance $L_2$ of bearing axis (13) by the difference between the co-sine of the former angle $\beta$ multiplied by the distance between the center of bore 14 and the center of bearing 13 and the co-sine of the reduced angle $\beta$ multiplied by the same center distance. Such a lengthening of the co-sinusidal distance $L_2$ now forces a downward motion of the displacement piston (19).

The overall amplifying ratio of this mechanical arrangement is the ratio between vertical motion of stem (21) divided by the vertical motion of displacement piston (19). A typical amplifying ratio of 35 to 1 can be achieved by using a $\beta$ angle of 15° and a wedged profile having an increase in width between minimum and maximum stem travel of 40% of stem travel. By decreasing the $\beta$ angle to 10°, for example, the amplifying ratio can be increased to 50 to 1 with the same stem profile.

Note, since the angle $\beta$ is well below 45°, the geometric relationship between pivots (11) and fulcrum (14) is that of an obtuse triangle and the downward displacement of lower bearings (10) is therefore a function of the cosine of the change in angle β.

A typical application in use of such mechanical amplifying means is given in FIG. 1. Here the resultant downward displacement of piston (19) following the commands of pneumatic cylinder (24), causes a downward deflection of a metal diaphragm (25) which is suitably retained between housing (6) and a valve body (26) having an inlet port (27) and an outlet port (28). The downward deflection of metal diaphragm (25) will eventually lead to closure of a central valve port (29) and thereby interrupt fluid flow between ports (27) and (28).

Since my invented amplifying means can create substantial forces (such as 1,000 lb. force exerted upon diaphragm (25) with only 35 lb. force input by cylinder (24), the same diaphragm (25) can be subjected to very high fluid pressures and still allow tight shutoff of valve port (29). Furthermore, since all static forces acting on bearings and shafts are uni-directional, there is no loose play that may effect the position of the translated motion leading to an extremely accurate positioning of displacement piston (19). It should also be noted that with the use of ball bearings there is very little friction involved and the angle β, for example, can be reduced to less than 10° without leading to self-locking of the mechanical parts.

In order to avoid damage to the toggle mechanism by an accidental overloading of stem (21), my invention can be utilized with an over-riding device consisting of a coiled compression spring (30), which is preloaded to the desired maximum force of stem (21) between a shoulder (31) of the cylinder stem (35) and a similar shoulder (32) on stem (21). A keying element (33) keeps the spring from unwinding during the normal operation of the amplifying device but allows additional compression of spring (30) and additional downward motion of cylinder stem (35) in an emergency by being able to permit keying element (33) to move upward in void (34).

Having thus shown and described the invention, what is claimed as new and desired to be secured by Letters Patent is described in the following claims:

1. Mechanical amplifying means for valves and other devices comprising:
   a. one pair of identical toggle elements mounted in spaced relationship between a pair of opposed parallel outer plates whose upper terminating surfaces extend above the upper extremity of said pair of toggle elements and whose lower terminating surfaces are shortened in relationship to the lower extremity of said toggle elements, each of said toggle elements pivotably supported by shaft means which are suitably retained within said pair of outer plates;
   b. each of said toggle elements comprising one or more upper bearings suitably supported above said shaft means and between a pair of opposed parallel inner plates, and one or more lower bearings suitably rotatably supported below said shaft means and between the same pair of inner plates whose outer periphery does not exceed that of the bearings, the geometric relationship between said upper bearing, said shaft means and said lower bearing is that of an obtuse triangle;
   c. a housing having a central opening to receive said pair of toggle means mounted between said pair of outer plates;
   d. displacement means mounted within the lower portion of the housing opening, having a flat upper surface being subjected to rolling motion of the lower bearings; and
   e. retaining means closing up the upper portion of the central opening of said housing and being in contact with the upper terminating surfaces of said pair of outer plates, and having a central passage axially aligned with said central opening of said housing for retaining within a slideable stem having a lower tapered extension capable of sliding between said pair of outer plates and engaging and displacing said upper bearings and thereby pivoting said pair of toggle elements around said shaft means, said pivoting motion further causing said lower bearings to extend their co-sinusidal distance with respect to the supporting shaft means and thereby causing a downward motion of said displacement means.

2. Mechanical amplifying means for valves and other devices as described in claim 1, wherein said retaining means is adjustably mounted within said housing opening, capable of altering the distance between itself and said displacement means.

3. Mechanical amplifying means for valves and other devices as described in claim 1, wherein said slideable stem has a lower extremity capable of engaging between said pair of outer plates and displacing said upper bearings and wherein said lower extremity is shaped to cause a nonlinear relationship between the motion of the stem and the amount of displacement of the upper bearings.

4. Mechanical amplifying means for valves and other devices as described in claim 1, wherein said slideable stem is connected to valve actuating devices of conventional design.

5. Mechanical amplifying means for valves and other devices as described in claim 1, where said displacement means is cooperating with closure means capable of opening and closing a valve orifice.

* * * * *